Oct. 19, 1937.   G. E. HOUPLAIN   2,096,516
REGULATOR FOR COMPRESSED AIR BRAKES
Filed Sept. 27, 1933
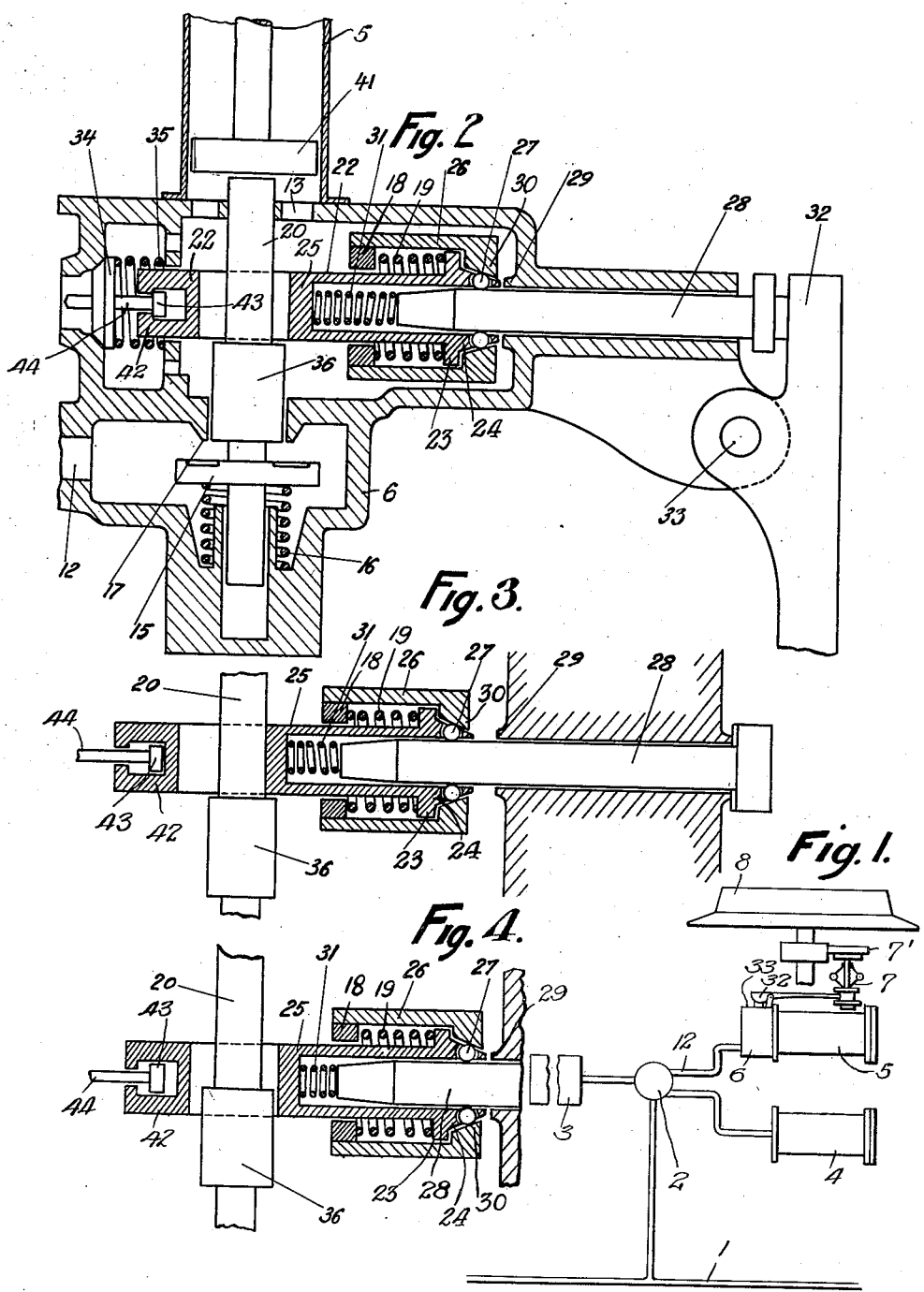
G. E. Houplain
INVENTOR
By Marks & Clerk
Attys.

Patented Oct. 19, 1937

2,096,516

UNITED STATES PATENT OFFICE 2,096,516

REGULATOR FOR COMPRESSED AIR BRAKES

Georges Emile Houplain, Paris, France

Application September 27, 1933, Serial No. 691,216
In France October 4, 1932

3 Claims. (Cl. 188—181)

The present invention concerns an automatic regulator for compressed air brakes whose object is to prevent the stopping and the skidding of the wheels of the braked car on the rail, this in conformity with the conditions prescribed in the final protocol of the International Commission for Railways, held in Berne on May 11, 1909, which condition reads as follows:

"Type of brake of simple construction and an automatic regulator of the pressure according to the load, obviating the skidding and the clogging of the wheels".

In spite of the obvious importance of the realization of this condition, both for fast trains and for goods trains, no simple device has yet enabled such realization to be performed; for this reason the above clause has even been cancelled from the requirements that have to be complied with by a continuous brake for goods trains.

The problem to be solved was the following: in order to avoid the skidding of the wheels on the rail during the braking period, it is necessary to let the pressure of the brake block drop as the speed of the car goes down, as it is well known that the coefficient of friction increases as the speed goes down, and this, at a rather high rate.

On the other hand, it is known that there cannot be rolling and skidding of the wheel on the rail at the same time except for the very short period of transition from one of these states to the other. It is during this transition period that the regulator has to be effective. As this period is extremely short (of the order of a second), it is necessary that the variation of the pressure of the brake shoe on the tyre of the wheel be almost instantaneous.

According to the invention, the device controlling the braking effort produced by the cylinder of a pneumatic brake system so as to prevent the stopping of the wheels, comprises an inlet valve and an outlet valve, a centrifugal governor actuated by a wheel of the car, means for maintaining the inlet valve open by this centrifugal governor when the speed of rotation of the wheel is sufficiently high and for setting this valve free when the speed decreases, means for maintaining this valve closed as soon as it has been set free, and means for controlling by the centrifugal governor the opening of the outlet valve.

One embodiment of the invention has been described hereinafter with reference to the accompanying drawing in which:

Fig. 1 shows schematically the whole of the braking system.

Figs. 2 to 4 show in sectional elevation three different positions of operation of the controlling device.

In Figure 1, the invention is shown as applied to a two-cylinder brake; this figure shows the main air pipe 1 arriving to the distributor or triple valve 2, connected on one hand to the auxiliary compresed air tank 3 and on the other hand to the principal brake cylinder 4 and the auxiliary brake cylinder 5. The valve 6 is mounted on the auxiliary cylinder 5. The control valve 6 is coupled, in the manner described below, to a centrifugal governor represented schematically in 7, and driven by means of the roller 7' driven itself by the axle of the wheel 8 of the car.

The controlling device shown in Figs. 2 to 4 comprises a valve casing communicating through the pipe 12 with the distributor 2 of Fig. 1, and through the orifice 13 with the lower side of the brake cylinder 5. The communication between the pipe 12 and the cylinder 5 is controlled by an inlet valve 15 normally pushed against its seat 17 by the spring 16. The valve 15 is further provided with a rod 20 which is pushed down by the piston 41 of the brake cylinder when the latter is at rest, thus keeping the valve 15 open. On the other hand, a movable part 22 is fitted in the valve casing; this part 22 is provided with an abutment 25 adapted to hold open the inlet valve 15 by means of a stop ring 36 fitted on the rod 20. The right portion of the part 22 is constituted by a socket inside of which a rod 28, slightly tapered on its end, may slide, this rod being urged to the right by means of a spring 31. The right end of said socket carries an abutment 23 and a slightly conical terminal part 24 provided with balls 27 and forming an interlocking device with a cylinder 26 comprising at its left side an abutment 18 and at its right side a part 30 provided with a tapered aperture which is applied against the balls 27 by means of a spring 19 arranged between the abutments 18 and 23. This device allows the rod 28 to slide freely inside the socket provided in the part 22 from right to left, but it is locked when the said rod moves from left to right, thus forcing the rod 28 to carry the part 22 with it in the latter movement. A circular abutment 29 provided in the wall of the valve-casing, enables the locking device 26—27 to be unlocked and the part 22 to be set free again after it has travelled through a certain distance. A lever 32, pivoted in 33 to the valve-casing and submitted to the action of a centrifugal device 7 driven by the wheel of the car as illustrated in Fig. 1, tends to push the rod 28 towards the left when the car is moving.

The movable member 22 is coupled with a certain amount of play to an outlet valve 34 kept down on its seat by means of a spring 35, this coupling with play being obtained by means of a part in the form of a clamp 42 forming the end of the member 22, and by means of an abutment 43 fixed to the end of the rod 44 of the outlet valve 34.

The operation of the device is as follows:

When the train is at rest (Fig. 2), the valve 15 is lifted clear from its seat by the piston 41 of the brake cylinder 5 resting against the rod 26, the outlet valve 34 being kept closed by the spring 35. As soon as the car is moving (Fig. 4) the rod 28 moves to the left under the urge of the lever 32 acted upon by the centrifugal force. It thus locks, by means of the abutment 25, the inlet valve 15 in the open position. When the brake is applied, compressed air is introduced through the pipe 12 and penetrates through the orifice 13 kept open by the inlet valve 15 kept clear of its seat 17, into the braking cylinder, thus producing the braking effect. When the wheel slows down, the rod 28 is no longer acted upon by the lever 32 and moves to the right taking the part 22 with it by means of the locking device 27, as explained before in connection with Fig. 2. The latter first unlocks the valve 15 which is then pushed against its seat by the spring 16, and then opens the outlet valve 34; the pressure in the brake cylinder drops and the braking force decreases. When the rod 28 has arrived to the end of its travel, the abutment 29 unlocks the locking device 27, thus allowing the outlet valve 34 to close (Fig. 4) and a state of equilibrium is set up, in which the braking effort is of less magnitude. Due to this decreasing of the braking effort, the wheels will take up again a certain amount of speed and the rod 28 returns to the left under the action of the centrifugal governor. If the wheels again tend to clog, the governor again opens the outlet valve, and so on till to the stop of the car or till to the release of the brake. The interest of the device resides in the fact that the compressed air is no more introduced again into the cylinder during the whole period of slowing down of the vehicle, it thus being possible to obtain a very smooth braking, without impacts, due to the regular decrease of the braking effort. It should be noted that in these successive equilibrium positions, the piston of the cylinder will always be at the end of its stroke, since the compressed air contained in the cylinder is constantly acting upon this piston, but the effort it exerts on the brake shoe will decrease owing to the decrease of the pressure inside the cylinder.

For releasing the brake, the control valve 6 is put into communication, through the triple valve 2, with the main pipe 1 communicating with the atmosphere: the compressed air contained in the brake cylinder then lifts the valve 15 and escapes to the atmosphere, thus allowing the piston 41 to come back to rest.

What I claim is:—

1. In a pneumatic braking system for railways and the like, a braking cylinder, a device for controlling the braking effort produced by said cylinder and comprising an inlet valve and an outlet valve, a centrifugal governor actuated by a wheel of the car, means for maintaining the inlet valve open by this centrifugal governor when the speed of rotation of the wheel is sufficiently high and for setting this valve free when the speed decreases, means for maintaining this valve closed as soon as it has been set free, and means for controlling by the centrifugal governor the opening of the outlet valve.

2. In a pneumatic braking system for railways and the like, a braking cylinder, a device for controlling the braking effort produced by said cylinder and comprising an inlet valve and an outlet valve, a centrifugal governor actuated by a wheel of the car, means for maintaining the inlet valve in the open position by the piston of the braking cylinder when the brake is released, a rod sliding in the body of the control device, means for controlling the displacements of this rod by the centrifugal governor, means for locking said inlet valve in its open position by this rod when the speed of rotation of the wheel is sufficiently high, a spring disposed in a manner to close the inlet valve when said rod sets this valve free at a decrease of speed, and means for controlling by said rod the opening of the outlet valve.

3. In a pneumatic braking system for railways and the like comprising an auxiliary compressed air tank, a braking cylinder, a piston movable inside this cylinder, a triple valve connected on one hand to this tank and on the other hand to this cylinder and to the atmosphere, a control device disposed between the triple valve and the cylinder, inside this device a chamber communicating with the triple valve and the cylinder, an inlet valve between this chamber and the triple valve, a second chamber directly connected to the braking cylinder, an outlet valve between this second chamber and the atmosphere, a rod integral with the inlet valve, this rod being pushed by the braking piston when the brake is released, in a manner to maintain this inlet valve open, a centrifugal governor actuated by a wheel of the vehicle, a rod sliding inside the body of the control device, means for controlling the displacements of this rod by the centrifugal governor, a member movable inside the valve and pushed by the said rod in the direction of displacement of this rod corresponding to a decrease of the speed, a ball locking device between this movable member and this rod disposed in a manner to render this movable member integral with this rod for one direction of the displacement of the rod corresponding to a decrease of the speed, means for locking the inlet valve in its open position by this movable member when the speed is sufficiently high, a spring provided in a manner to close the inlet valve when the said member sets it free on the occurrence of a decrease of the speed, means for coupling with a certain amount of play this movable member to the outlet valve of the control device, means for disengaging the ball locking device after the opening of this outlet valve.

GEORGES EMILE HOUPLAIN.